United States Patent [19]

Neeley et al.

[11] Patent Number: 4,928,262

[45] Date of Patent: May 22, 1990

[54] MARINE SEISMIC STREAMER RETRIEVAL SYSTEM

[75] Inventors: Walter P. Neeley, Irving; Sammie F. Ritter, Roanoke, both of Tex.

[73] Assignee: Mobil Oil Corporation, New York, N.Y.

[21] Appl. No.: 269,049

[22] Filed: Nov. 9, 1988

[51] Int. Cl.$^5$ ............................................. G01V 1/38
[52] U.S. Cl. ..................................... 367/106; 367/16; 367/19
[58] Field of Search .................... 367/16–19, 367/130, 106; 114/244, 245

[56] References Cited

U.S. PATENT DOCUMENTS

| | | | |
|---|---|---|---|
| 3,077,944 | 2/1963 | Padberg | 181/120 |
| 3,425,506 | 2/1969 | Evans | 367/16 |
| 3,654,649 | 4/1972 | Richardson | 114/294 |
| 3,673,556 | 6/1972 | Biggs | 367/18 |
| 3,794,965 | 2/1974 | Charske | 367/18 |
| 4,541,079 | 9/1985 | Thigpin | 367/19 |
| 4,555,779 | 11/1985 | Roberts | 367/19 |
| 4,823,325 | 4/1989 | Cole, Jr. | 367/19 |

Primary Examiner—Thomas H. Tarcza
Assistant Examiner—Daniel T. Pihulic
Attorney, Agent, or Firm—Alexander J. McKillop; Charles J. Speciale; George W. Hager, Jr.

[57] ABSTRACT

A marine seismic streamer having a plurality of seismic recovery units spaced along the length thereof. Each unit includes an inflation flotation device that will deploy when the streamer sinks to a trigger depth which is continuously adjusted in response to the actual operating conditions at the time.

24 Claims, 4 Drawing Sheets

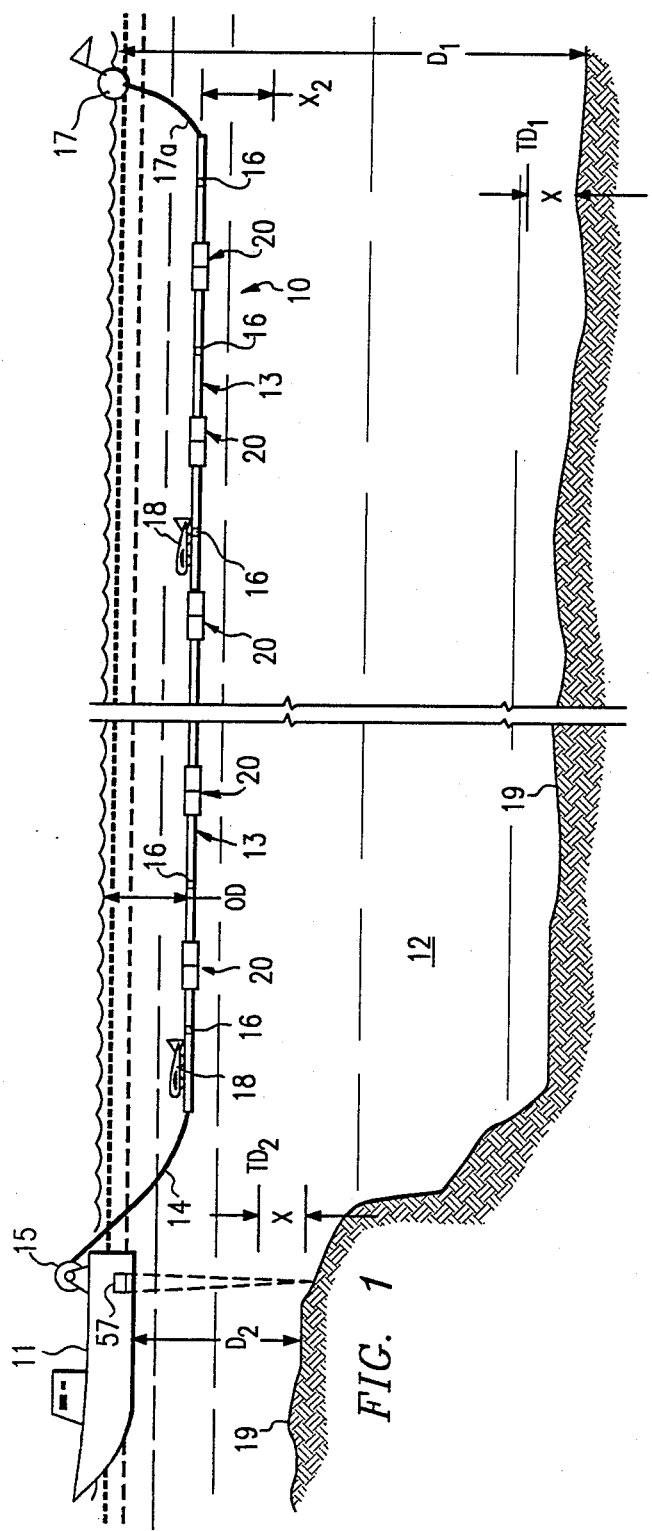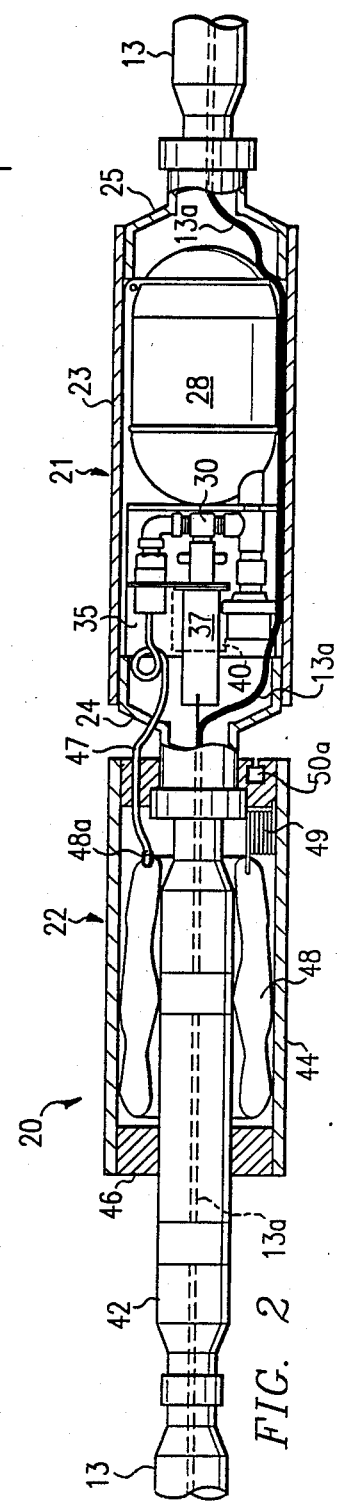

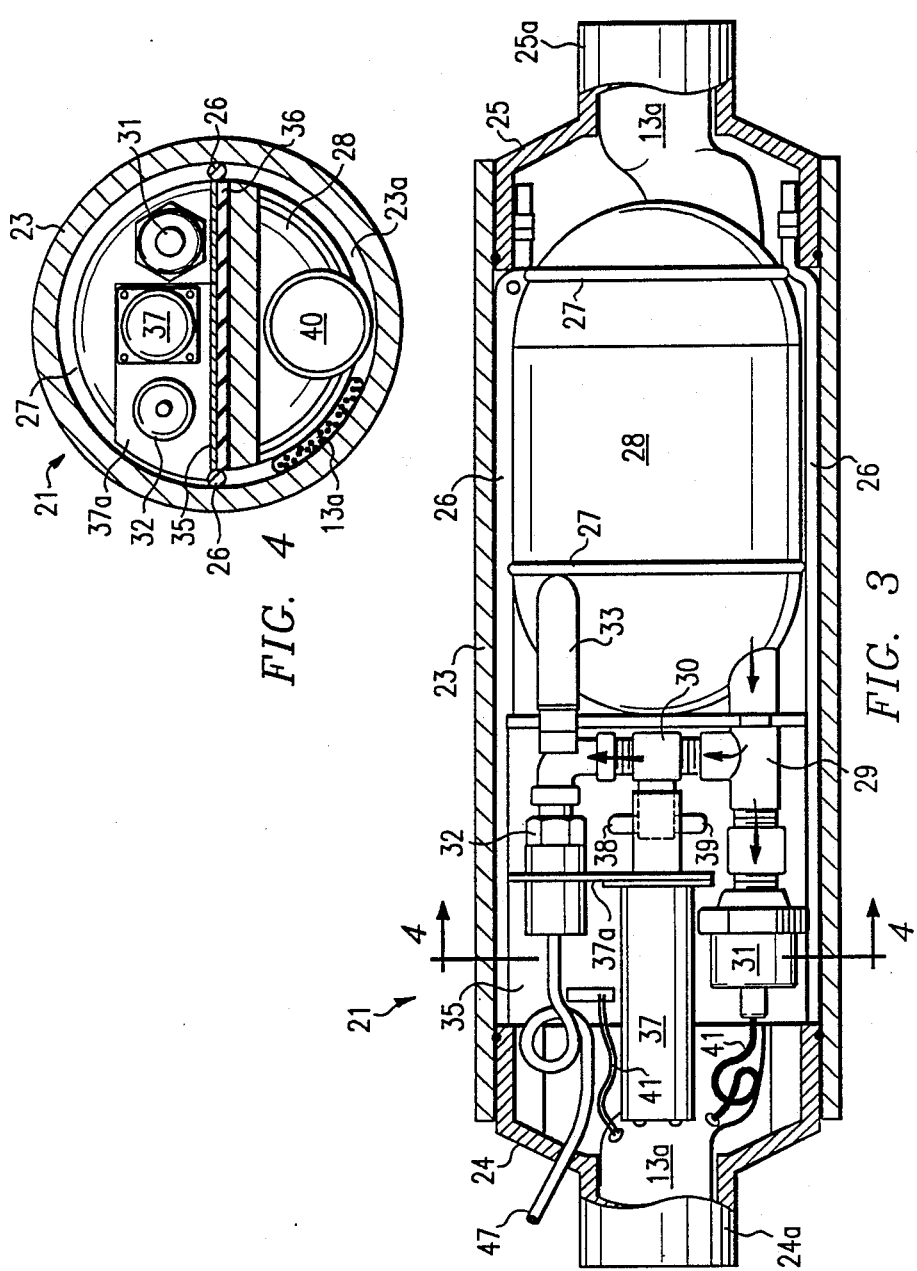

MARINE SEISMIC STREAMER RETRIEVAL SYSTEM

DESCRIPTION

1. Technical Field

The present invention relates to a marine seismic streamer system and in one of its preferred aspects relates to a method and system for deploying an inflatable device to help raise a disabled streamer when the streamer reaches a predetermined trigger depth that is continuously updated during operations.

2. Background Art

In marine seismic surveys, a source of acoustical energy is used to generate sonic pulses or shock waves in the water. These waves travel downward in the water, through the water bottom, and through the earth formations underlying the bottom. Part of the acoustical waves passing through the earth formations underlying the bottom are reflected upward therefrom and are sensed by sensors, (e.g., streams of hydrophones) which convert the acoustical waves to electronic signals. These streamer(s) are normally towed by the same vessel that is towing the acoustical energy source. These signals are then conditioned and processed to provide valuable information both as to the composition of the various formations and to the possibility that such formations may contain mineral deposits such as hydrocarbons.

A typical marine seismic streamer, sometimes called "seismic cable", is made of individual sections (200–300 feet long) joined together to form streamers up to more than two miles in length. Each section has a "carcass" which is comprised of a bundle of electrical transmission and communication lines, metal cable stress-bearing member(s), and the hydrophones, themselves. The carcass is encased in a small diameter jacket (e.g., $\approx 3$ inches) of plastic or like material, which, in turn, is filled with a lightweight oil or the like to provide the streamer section with a neutral or slightly positive buoyancy. Depth controllers, commonly called "birds", are spaced at intervals along the streamer which maintain the streamer at a desired depth during a seismic operation.

In a routine seismic operation, a streamer is towed a short distance behind a vessel at a depth of a few feet (e.g., 65 feet). Since the streamer is submerged and cannot be seen from the surface, it is carefully marked by a tail buoy. Further, recognized marine warning signals are displayed by the towing vessels in an attempt to alert others to the presence of the long streamer being towed behind the vessel. In spite of these precautions, a real danger still exists that a passing vessel may cross the streamer and sever or otherwise disable it. Further, unmarked submerged hazards may snag and/or sever the streamer during a seismic operation. Since the cost of many modern streamers now exceeds a half million dollars, the loss of all or any part of the streamer can result in a substantial financial loss. Further, the resulting delays in obtaining a replacement for the lost streamer, especially in remote areas, can be costly both in time and in money.

There have been several techniques and systems proposed for retrieving a seismic streamer in the event it or a part of it becomes separated from the vessel. Most of these techniques include the use of a tail buoy which floats on the surface and which is connected to the extreme trailing or tail end of the streamer by a long line. The tail buoy is usually equipped with a radio beacon, radar reflector, and/or flashing lights. When the streamer is severed, the vessel senses loss communication through the streamer (e.g., signals from the hydrophones) and hopefully zeros in on and physically retrieves the tail buoy which, again, is hopefully still attached to the severed streamer. However, as is often the case, at least a portion of the lightweight fluid which provides the neutral buoyancy for the streamer is lost when the streamer is severed and the weight of the severed streamer is great enough to drag it and the tail buoy, if the buoy remains attached, to the bottom where locating and recovering the streamer is extremely difficult, if possible at all.

More sophisticated systems are known for retrieving severed streamers. For example, in U.S. Pat. No. 3,425,506, a system is disclosed wherein a plurality of chambers are provided along a streamer which automatically inflate if the streamer sinks below a preset trigger depth thereby providing sufficient buoyancy to raise the streamer to the surface. However, once the trigger depth is set, it cannot be changed during a seismic operation unless the streamer is retrieved aboard the vessel. If the streamer is towed into water where the bottom depth is less than the preset trigger depth, the chambers on the streamer cannot inflate even if the streamer is severed. Further, the chambers will inflate at the trigger depth even if the streamer remains connected to the vessel and is in otherwise good operating condition thereby causing unwarranted delays in the seismic operation.

Another seismic streamer retrieval system is disclosed in U.S. Pat. No. 3,794,965 wherein ballast water is automatically pumped from chambers along the streamer in response to a power failure through the streamer thereby providing the buoyancy necessary to raise the streamer. While this system functions to raise the streamer if it should be severed, it also raises the streamer if there is only a temporary, sometimes deliberate and necessary, interruption of power; again causing unnecessary delays in the seismic operation.

Still another retrieval system is disclosed in U.S. Pat. No. 4,541,079 wherein portions of the streamer jacket, itself, are inflated in response to a specially-coded, acoustical signal which is sent by an operator aboard the towing vessel to receivers in the severed streamer. However, the reliability of such systems are considered low since the transmission of coded acoustical signals through large bodies of water presents obvious problems.

DISCLOSURE OF THE INVENTION

The present invention provides a marine seismic streamer system which is to be towed through a body of water wherein a plurality of streamer recovery units (SRU) are spaced along the length of the streamer. Each SRU contains an inflatable, flotation device which will automatically inflate if communication is lost through the streamer between the vessel and the SRU and the streamer sinks to a predetermined trigger depth. The trigger depth is continuously computed aboard the vessel and will change with the depth of the marine bottom or with the operational depth of the streamer. That is, in one embodiment, the trigger depth is equal to a predetermined, fixed distance, e.g., 15 feet, above the actual measured depth of the bottom of the water which the vessel is in when the depth measurement is made. In another embodiment, the trigger depth is equal to a predetermined depth, e.g., 5 feet, below the operational depth at which the streamer is being towed at the time.

A signal, representative of the trigger depth is continuously sent to data processing circuitry in the SRU where the last received signal if stored and compared to a signal representative of the then operating depth of the streamer. If the operating depth equals or exceeds the trigger depth, an output signal is generated by the circuitry. If there is still communication with the vessel (streamer not severed), the output signal will only sound an alarm aboard the vessel and an operator has to make a decision whether or not to manually inflate the flotation devices. If there is no communication (streamer severed), the output signal will drive a motor to open a valve to automatically inflate the devices without any further command from the vessel.

By continuously computing a new trigger depth signal based on the changing bottom depth or operational depth and by continuously storing the last computed trigger depth signal in the SRU, the flotation devices will always be inflated at a trigger depth which is above the marine bottom regardless of any substantial changes in the bottom depth itself.

More specifically, each SRU is comprised of a housing which is adapted to be connected into the streamer. A compressed gas tank is mounted in the housing and has an outlet which, in turn, is opened and closed by a valve. An inflatable, flotation device, e.g., buoy, is stored in the housing and is connected by a hose to the valve. Data processing circuitry (e.g., computer board) in the housing receives and stores a trigger depth signal which is computed aboard the vessel and transmitted through the streamer. Each signal, as received, dumps the prior signal and replaces it in storage so that the last received signal is always stored in the SRU.

A means, e.g., pressure sensor, is provided in the housing for continously measuring the operating depth of the streamer and for generating a signal representative thereof which, in turn, is continously compared with the last received trigger depth signal. When the operating depth signal equals or exceeds the last received trigger depth signal, an output signal is generated. A communication signal is established between the vessel and the SRU which, when lost, will indicate an emergency. A means is provided in the housing which is responsive to this communication system to override the output signal for so long as the communication system is being received at the SRU. If this signal is lost, the output signal will actuate a motor to open the valve on the outlet of the compressed gas tank to inflate the flotation device, e.g., buoy. The portion of the housing surrounding the buoy is of frangible material so it will break away upon inflation of the buoy device so the inflated buoy is free to rise toward the surface. A long length of flexible line which attaches the buoy to the housing is payed out as the buoy rises. A self-contained power source, e.g., battery, is positioned in the housing to furnish the necessary power to operate the SRU in the event of interruption of external power through the streamer.

BRIEF DESCRIPTION OF THE DRAWINGS

The actual construction, operation, and apparent advantages of the present invention will be better understood by referring to the drawings in which like numerals identify like parts and in which:

FIG. 1 is a perspective view of the present marine seismic system being towed through a body of water by a vessel;

FIG. 2 is a cross-sectional view of the streamer recovery unit (SRU) of the present invention;

FIG. 3 is an enlarged cross-sectional view of the inflation section of the SRU of FIG. 2;

FIG. 4 is s section view taken along line 4—4 of FIG. 3;

BEST MODE FOR CARRYING OUT THE INVENTION

Figure 5:
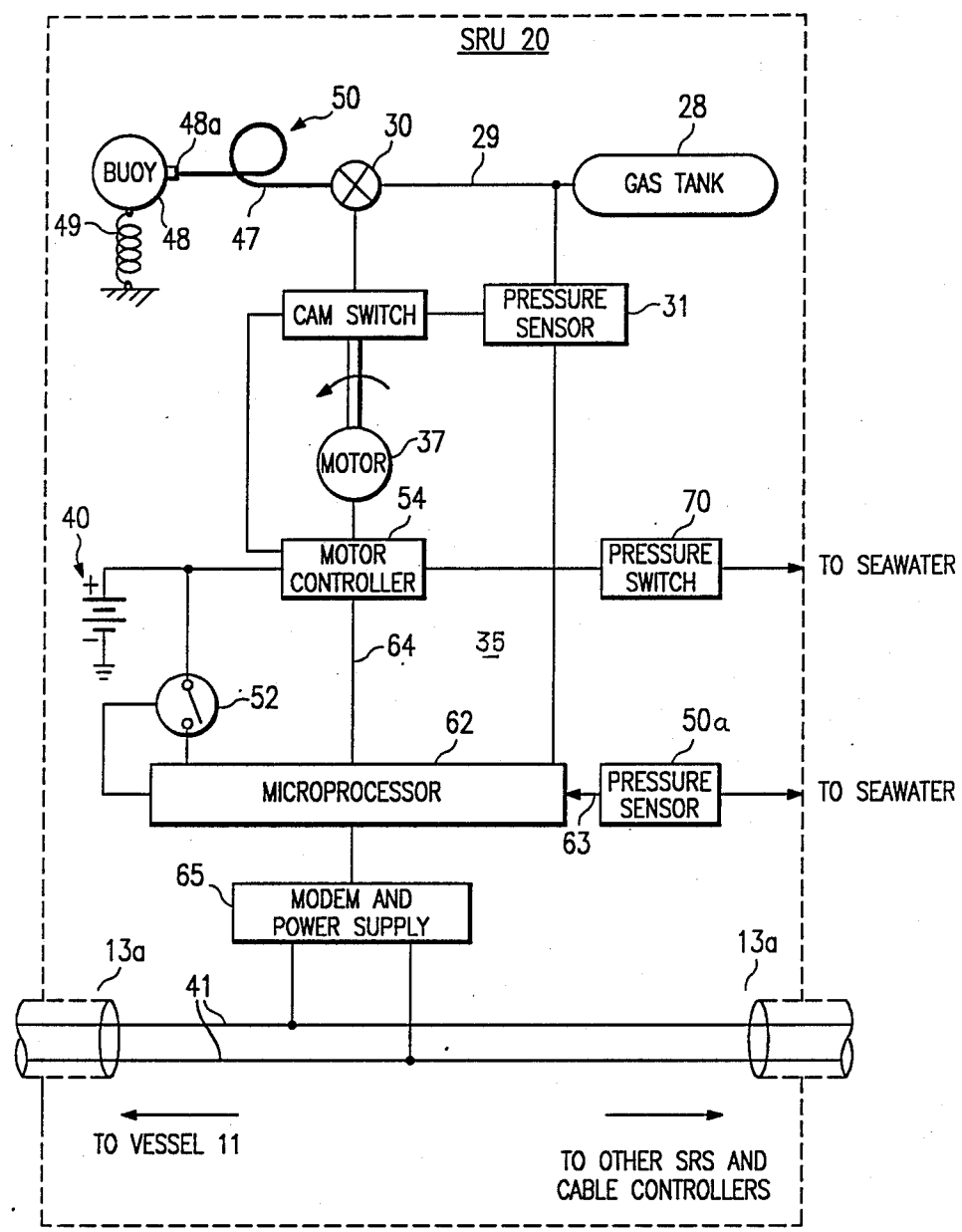
FIG. 5 is a schematic view of the components of present seismic streamer retrieval system which are positioned on the streamer.

Referring more particularly to the drawings, FIG. 1 illustrates marine seismic streamer 10 being towed by vessel 11 through a body of water 12. Streamer 10 is comprised of a plurality of sections 13, each of which may be from 100 to 300 feet long. Only a few sections have been shown but it should be understood many sections normally make up a typical streamer which, in turn, can reach lengths of two miles or more.

Streamer 10 is attached to vessel 11 by a lead-in connector cable 14 (e.g., 400–600 feet long) and is paid out from reel 15. Each streamer section 13 includes hydrophones 16 (only a few shown) and a bundle 13a of electrical transmission and communication lines, and stress-bearing members (e.g., steel cables), all of which are encased in a jacket of plastic or like material, which, in turn, is filled with a lightweight fluid, e.g., oil, to establish a neutral or slightly positive buoyancy for the streamer section 13. A tail buoy 17, normally equipped with audio and/or visual signals, is attached to the trailing end of streamer 10 by a rope 17a or the like. A plurality of conventional paravanes or "birds" 18 (only a few shown) are spaced along the length of streamer 10 which maintains streamer 10 at a desired operational depth "OD" (e.g., 65 feet) during a seismic survey operation.

As will be understood in the art, due to its long length, streamer 10 is exposed to certain potential hazards while it is being towed. That is, streamer 10 may be severed or otherwise disabled by a passing vessel, a submerged hazard, etc. When severed, the lightweight fluid is likely to flow from the ruptured jacket thereby causing the affected streamer sections to lose their neutral buoyancy whereupon the dead weight of these sections is likely to drag the severed streamer and the tail buoy 17, if still attached, to the marine bottom 19.

In accordance with the present invention, a streamer recovery system (SRS) is provided for the streamer 10 that can be actuated either manually or preferably automatically to inflate flotation devices which are spaced along the streamer to thereby raise the severed section(s) to the surface. The SRS deploys automatically at a set trigger depth which is constantly adjusted during the seismic operation in response to (1) the actual depth of the bottom 19 of the water in which the streamer is being towed at the time it is severed or (2) the operational depth of the streamer. As will be seen from the following description, this insures that the SRS will always be deployed or "triggered" at a depth less than that of the bottom depth even when the streamer may be severed in relatively shallow water.

The present streamer recovery system for streamer 10 is comprised of one or more streamer retrieval units (SRU) 20. As will be understood in the art, units 20 will be spaced along the length of streamer 10 (FIG. 1) at intervals (e.g., 150 feet or so) whereby there will be a sufficient number of units present in any severed portion of streamer 10 to provide the buoyancy necessary to raise the severed portion.

Referring now to FIGS. 2, 3, and 4, SRU 20 is comprised of a control and inflation section 21 and a flotation section 22, joined together as shown in FIG. 2. Inflation section 21 (shown in FIG. 3) is comprised of a cylindrical housing 23 which is closed at either end by bulkheads 24, 25. A frame comprised of elongated rods 26 and arched cross members 27 is positioned and secured in housing 23 to hold and support compressed gas storage tank 28.

Tank 28 has an outlet T-fitting 29 which, in turn, has one passage connected to valve 30 and another passage connected to pressure transducer 31 which continuously measures the pressure in tank 28 and transmits a signal representative thereon through electrical cable 41 to computer board 35 where it is converted to binary serial signal and transmitted via bundle 13a to vessel 11. Valve 30 is connected to hose fitting 32 which is supported by brace 33 on tank 28. Data processing and control circuitry is provided on computer board 35 which, in turn, is mounted on a layer of insulation 36 and is secured within housing 23 between rods 26 for a purpose described later.

An electric, rotary motor 37 is mounted in bracket 37a in housing 23 and, when actuated, is adapted to rotate valve 30 between its closed and open positions. Cam followers 38, 39, on the output shaft of the motor are adapted to contact limit switches (not shown) to stop the motor after the desired limited movement of valve 30 is achieved. A self-contained power source, e.g., battery 40 (FIG. 4 only) is mounted within housing to provide power for SRU 20 when needed as will be discussed in more detail below.

The bundle 13a of electrical control and transmission lines, stress-bearing member(s), etc., which runs through each streamer section 13 (FIG. 1), pass into housing 23 through connector 24a on bulkhead 24, through the annulus 23a between housing 23 and tank 28 (FIG. 4), and out through connector 25a in bulkhead 25 to provide the required continuity through streamer 10. Power and transmission leads 41 are taken from bundle 13a for furnishing external power and communication between each SRU 20 and vessel 11.

Flotation section 22 (FIG. 2 only) is comprised of a short streamer extension 42 which couples one end of a streamer section 13 to connector 24a on inflation section 21. Bundle 13a extends through the core of extension 42. Cylindrical housing 44 is secured at each end to extension 42 by spacers 46, 47, and is comprised of a frangible material (e.g., 4.5 inch diameter, 3/16 inch thick polyurethane) whereby it will rupture when flotation device, e.g., inflatable buoy 48, is inflated. Buoy 48 is folded within housing 44 and is wrapped around extension 42 and is attached to spacer 47 by a coiled flexible line 49. A hose 50 or the like extends from hose fitting 32 (FIG. 3) in inflation section 21, through bulkhead 24 and spacer 47, and is releasably connected to an inflation valve 48a on buoy 48 so that it will separate from buoy 48 as it rises upon inflation. A pressure sensor 50 (e.g., Series 10, Pressure Sensor, Keller PSI, Oceanside, Calif.) is positioned on housing 44 to sense the pressure, hence the depth, of the water in which SRU 20 is operating and to generate a signal representative thereof.

The operation of SRU 20 is as follows: Referring first to FIG. 1, streamer 10 equipped with a plurality of SRUs 20 spaced along its length is towed by vessel 11 through water 12 to carry out a routine marine seismic survey. External power and communications are provided to each SRU 20 through appropriate leads in bundle 13a that extends throughout the length of streamer 13a.

Referring now to FIG. 5, external power is furnished to operate SRU 20 from lines 41 through element 65, which is located on computer board 35. If external power should fail (e.g., streamer 10 is severed), switching element 52, e.g., field-effect, transistor switch, will switch over to battery 40 which then furnishes the electrical power for operating SRU 20.

A communication signal is modulated on an 18 volt DC signal supplied by vessel 11 through transmission line pair 41 in bundle 13a of the streamer 10. The data communication is handled in simplex form over transmission line pair 41 with the vessel 11 requesting data then "listening" for a reply from the computer board 35 in the addressed SRU. This permits an operator aboard vessel 11 to transmit prearranged codes and receive back desired information from each SRU 20 along the streamer 10.

Figure 6:
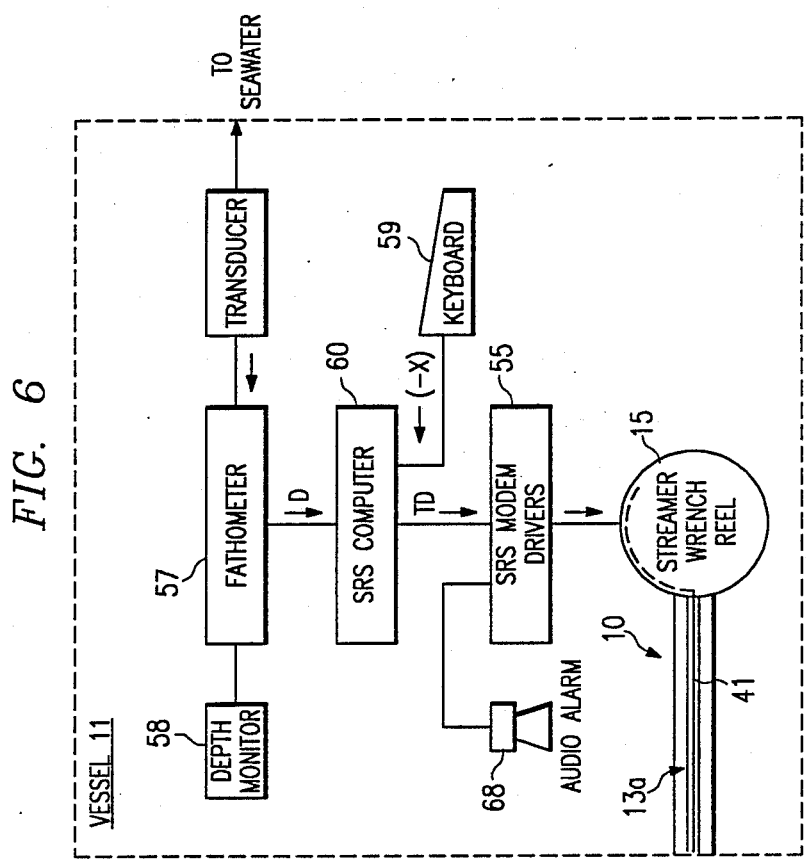
FIG. 6 is a schematic view of the components of the present seismic streamer retrieval system which are positioned aboard the vessel.

During operations, the actual depth D of marine bottom 19 underlying vessel 11 is continuously measured by a bottom locator, e.g., standard, commercially-available fathometer 57 (FIG. 6), which, in turn, generates a sign "D" representative thereof which, in turn, is fed to a visual readout 58 or the like. Depth signal D is also fed into a SRS computer circuit 60 or equivalent where it is combined or added to a manually encoded signal $(-X)$ (via keyboard 59) which is representative of a predetermined constant value equal to the fixed distance above bottom 19 at which buoy 48 is to be automatically inflated in the event communication with SRU 20 is lost. That is, if streamer 10 is severed or otherwise disabled, affected SRU's will be automatically actuated at the "trigger depth" TD which is always a distance X (e.g., 15 feet) above the marine bottom regardless of any changes in the actual depth D of the bottom.

Computer 60 continuously combines the bottom depth signal (D) with the fixed value signal $(-X)$ and outputs the "trigger depth" signal (TD), which, in turn, is fed through the modem 55 to reel 15 to line 41 to the board 35 in SRU 20. Each new TD signal "dumps" the previously received TD signal and stores the last received signal. At the same time, the last received TD signal on board 35 is applied in a comparison in microprocessor 62 on board 35 (FIG. 5).

The operating depth (i.e., depth at which streamer 10 is being towed) is continuously measured by sensor 50a which generates a representative signal "OD" which, in turn, is both applied to microprocessor 62 through line 63 for comparison to the last received TD signal on Board 35. Microprocessor 62 continously compares the OD and TD signals but only outputs a trigger signal when the operating depth equal or exceeds the last received trigger depth. That is, microprocessor 62 will output no signal until the streamer 10 sinks to the trigger depth which, in turn, is constantly being adjusted in relation to the actual bottom depth at the time.

Any trigger signal from microprocessor 62 is applied to an input of motor controller 54 through line 64 or to the modom 65 to line 41 to the vessel 11. If the communication signal through line 41 is still being received at computer 60 (indicates streamer not severed), the communication signal will override the trigger signal whereby only alarms 68 will be actuated aboard vessel. The operator will then access the situation and either ignore the alarm or manually actuate the SRU's.

If there is no communication signal at computer 60, this indicates streamer has been severed or disabled and the trigger or output signal from microprocessor 62 will pass through motor controller 54 to actuate motor 37 to open valve 30 to inflate buoy 48. As buoy 48 inflates, it ruptures the frangible housing 44 and rises against payed-out line 49 as hose 50 slips from inflation valve 48a, or also pays out.

Figure 7:
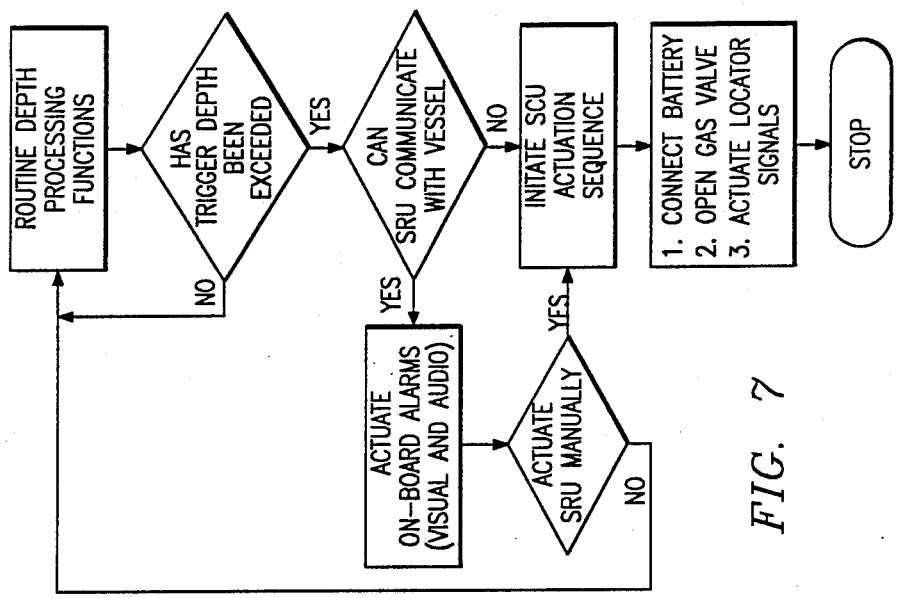
FIG. 7 is a logic flowchart of the present invention.

Of course, if streamer 10 is severed or external power fails for some other reason, switching element 52 responds instantaneously to switch SRU 20 to internal power, i.e., battery 40. Since no further TD signals will be received, the last received signal remains in effect, insuring that buoy 48 will be inflated at a depth equal to distance X about the actual bottom D; this being the last bottom depth measured and used to calculate TD before streamer 10 was severed. The actual sequence of steps involved in the present invention can be programmed on board 35. A flowchart for the logic involved is shown in FIG. 7 which is self-explanatory. As a back-up safety measure, a pressure actuated switch 70 (FIG. 5) is provided which is preset to a predetermined depth at the time streamer 10 is deployed and can not be changed until the streamer is retrieved. The present depth is usually always greater than the calculated trigger depth but provides at least a chance that buoy 48 will be deployed if all other systems fail. If the present depth is reached, switch 70 connects motor controller 54 to battery 40 to drive motor 37 to open valve 30. Preset switch 70 is basically the same type of actuating means used in prior art retrieval systems and has the same disadvantages in that, if switch 70 is preset at a depth which is greater than that of the marine bottom, buoys 48 will never be deployed by switch 70.

To further illustrate the present invention, reference is again made to FIG. 1. It can be seen that as streamer 10 is towed at an operating depth OD (e.g., 20 feet) in relatively deep water where the bottom depth is $D_1$ (e.g., 100 feet), fathometer 57 on board vessel 11 will continuously measure $D_1$ and a trigger depth $TD_1$ (e.g., 100 feet $-15$ feet or 85 feet) is computed based on $D_1$. This $TD_1$ is transmitted and stored in SRUs 20. If streamer 10 is severed in $D_1$ water, the SRUs 20 will deploy before the severed streamer touches bottom 19.

As streamer 10 is towed into relatively shallow water where the bottom is now at a depth $D_2$ (e.g., 50 feet), the trigger depth now becomes $TD_2$ (50 $-15$ or 35 feet). Again, if streamer 10 is severed in $D_2$ water, SRUs 20 will still deploy before the severed streamer 10 touches bottom. It should be clear that if the TD was preset at a fixed value, e.g., 85 feet, that SRUs 20 would not be deployed if the streamer 10 was severed in $D_2$ water. Further by being able to override the TD signal with the communication signal as explained above, the SRUs 20 in the present invention will not automatically deploy if streamer 10 is towed into water where the bottom D minus distance X is less than the OD of streamer 10. That is, in the present example, if D became 35 feet and X if fixed at 15 feet, the RD would become 20 feet or that equal to OD. However, since communication still exists if the streamer is not severed, the communication signal will override the TD signal and only the alarms the vessel 11 will sound alerting the operator of the situation.

In another embodiment, the trigger depth can be calculated based on the then current operating depth of streamer 10. That is, a fixed value $X_2$ (FIG. 1) is combined with the OD signal in computer 60 (FIG. 6) to generate the TD signal that is constantly supplied to board 35 in SRU 20. $X_2$ is equal to a predetermined distance, e.g., 5 feet, below the operational depth which the streamer 10 can sink before flotation devices 48 are to be automatically deployed. Once the TD signal is generated and supplied to SRU 20, all other operational steps are the same as set forth and described above. Since bottom depth D, is being constantly monitored, the TD signal can always be adjusted to be less than D so that SRU 20 will always deploy before the streamer reaches bottom.

What is claimed:

1. A marine seismic streamer system comprising:
   a marine seismic streamer;
   a vessel for towing said streamer through a body of water;
   at least one streamer recovery unit connected into said streamer, said unit comprising:
   a housing;
   a source of compressed gas positioned in said housing and having an outlet;
   a valve for closing and opening said outlet;
   an inflatable, flotation device stored in said housing;
   means for connecting said valve to said flotation device;
   means aboard said vessel for generating a trigger depth signal which is representative of the depth at which said flotation device is to be inflated;
   means in said housing for continuously receiving and storing said trigger depth signal through said streamer;
   means for continuously measuring the operating depth of said streamer; and
   means for opening said valve when said operating depth equals or exceeds the depth represented by said last received and stored trigger depth signal.

2. The seismic streamer system of claim 1 including a plurality of said streamer recovery/units spaced along the length of said streamer.

3. The seismic streamer system of claim 1 wherein said inflatable, flotation device comprises:
   an inflatable buoy; and
   a flexible line connecting said buoy to said housing.

4. The seismic streamer system of claim 3 wherein the portion of said housing surrounding said buoy is frangible whereby said portion will rupture to free said buoy when said buoy is inflated.

5. The seismic streamer system of claim 4 wherein said means for continuously measuring said operating depth of said streamer comprises:
   means on said housing for sensing the pressure of said body of water at said operating depth and generating a signal representative thereof.

6. The seismic streamer system of claim 5 wherein said means for opening said valve comprises:
   means for comparing said operating depth signal with said trigger depth signal and generating an output signal when said operating depth signal equals or exceed said trigger depth signal; and means in said housing connected to said valve and responsive to said output signal to open said valve.

7. The seismic streamer system of claim 6 including: self-contained means in said housing for supplying electrical power to said streamer recovery unit in the event transmission of electrical power through said streamer is interrupted.

8. The seismic streamer system of claim 7 wherein said self-contained means includes:
a battery.

9. The seismic streamer system of claim 8 including:
means to establish a communication signal between said vessel and said streamer recovery unit whereby loss of said signal indicates an emergency condition.

10. The seismic streamer system of claim 9 including:
means in said housing responsive to said communication signal for overriding said output signal to said means for opening said valve for so long as said communication signal is being received at said streamer recovery unit.

11. The seismic streamer of claim 1 wherein said means for generating said trigger depth signal comprises:
means for continuously measuring the depth of the marine bottom below said vessel and generating a signal representative thereof;
means for combining said depth signal with a signal representative of a fixed, predetermined distance above said marine bottom to generate said trigger depth signal.

12. The seismic streamer of claim 1 wherein said means for generating said trigger depth signal comprises:
means for continuously measuring the operational depth at which said streamer is being towed and generating a signal representative thereof;
means for combining said operational depth signal with a signal representative of a fixed, predetermined distance below said operational depth to generate said trigger depth signal.

13. A recovery unit for retrieving a disabled marine seismic streamer which has been towed by a vessel through a body of water, said unit comprising:
a housing adapted to be connected into said seismic streamer;
a compressed gas tank in said housing and having an outlet;
a valve for closing and opening said outlet;
an inflatable, flotation device stored in said housing;
means for connecting said valve to said flotation device;
means in said housing for continuously receiving and storing a signal representative of a trigger depth at which said flotation device is to be inflated, said signal being received and stored for so long as communication is maintained through said streamer between said vessel and said streamer and with said last received signal being retained if said communication is interrupted;
means for measuring the operating depth of said streamer; and
means for opening said valve when said operating depth equals or exceeds said trigger depth.

14. The recovery unit of claim 13 wherein said inflatable, flotation device comprises:

an inflatable buoy; and
a flexible line connecting said buoy to said housing.

15. The recovery unit of claim 12 wherein the portion of said housing surrounding said buoy is frangible whereby said portion will rupture to free said buoy when said buoy is inflated.

16. The recovery unit of claim 15 wherein said means for continuously measuring said operating depth of said streamer comprises:
means on said housing for sensing the pressure of the body of water at said operating depth and generating a signal representative thereof.

17. The recovery unit of claim 16 wherein said means for opening said valve comprises:
means for comparing said operating depth signal with said trigger depth signal and generating an output signal when said operating depth signal equals or exceeds said trigger depth signal; and
an electric motor in said housing connected to said valve and responsive to said output signal to open said valve.

18. The seismic streamer system of claim 17 including:
self-contained means in said housing for supplying electrical power to said recovery unit.

19. The recovery unit of claim 18 wherein said self-contained means includes:
a battery.

20. The recovery unit of claim 19 including:
means in said housing responsive to an external communication signal for overriding said output signal to said means for opening said valve for so long as said communication signal is being received at said streamer recovery unit.

21. A method of retrieving a marine seismic streamer which is towed by a vessel through a body of water in the event said streamer becomes disabled, said method comprising:
providing a plurality of recovery units spaced along the length of said streamer, each of said units having an inflatable, flotation device and a source of compressed gas therein;
continuously measuring the depth of the marine bottom as the vessel tows the streamer;
continuously generating a signal representative of a trigger depth at which said flotation devices are to be inflated;
continuously transmitting said trigger depth signal through said streamer to each of said units;
continuously storing only the last received trigger depth signal in said unit;
continuously measuring the operating depth of said streamer and generating a signal representative thereof;
continuously comparing said operating depth signal and said last stored trigger depth signal;
generating an output signal when said operating depth signal equals or exceeds said last stored trigger depth signal; and
inflating said flotation devices in response to said output signal.

22. The method of claim 21 including:
overriding said output signal as long as communication is maintained through said streamer between said vessel and said units.

23. The seismic streamer of claim 21 wherein said step 4 generating said trigger depth signal comprises:

continuously measuring the depth of the marine bottom below said vessel and generating a signal representative thereof; and combining said depth signal with a signal representative of a fixed, predetermined distance above said marine bottom to generate said trigger depth signal.

24. The seismic streamer of claim 21 wherein said step of generating said trigger depth signal comprises:

continuously measuring the operational depth at which said streamer is being towed and generating a signal representative thereof; and combining said operational depth signal with a signal representative of a fixed, predetermined distance below said operational depth to generate said trigger depth signal.

* * * * *